United States Patent
Lobo et al.

(10) Patent No.: US 10,203,215 B2
(45) Date of Patent: Feb. 12, 2019

(54) SYSTEMS AND METHODS FOR IDENTIFYING SOCIALLY RELEVANT LANDMARKS

(71) Applicant: Tata Consultancy Services Limited, Mumbai (IN)

(72) Inventors: Sylvan Lobo, Thane (IN); Pankaj Harish Doke, Thane (IN); Sujit Devkar, Thane (IN); Mridul Basumotari, Thane (IN); Sanjay Madhukar Kimbahune, Thane (IN); Sachin Sarawgi, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/464,919

(22) Filed: Mar. 21, 2017

(65) Prior Publication Data

US 2017/0328724 A1    Nov. 16, 2017

(30) Foreign Application Priority Data

May 12, 2016    (IN) .............................. 201621016625

(51) Int. Cl.
*G01S 19/45*    (2010.01)
*G01C 21/36*    (2006.01)
(Continued)

(52) U.S. Cl.
CPC ..... *G01C 21/3476* (2013.01); *G01C 21/3446* (2013.01); *G01C 21/3617* (2013.01);
(Continued)

(58) Field of Classification Search
CPC ..... G05D 1/0088; G06F 3/0482; G06F 3/011; G06F 3/04842; G06F 17/30244;
(Continued)

(56) References Cited

U.S. PATENT DOCUMENTS

2003/0125869 A1    7/2003 Adams, Jr.
2008/0319659 A1    12/2008 Horvitz et al.
(Continued)

OTHER PUBLICATIONS

B. Elias et al., "Automatic Generation and Application of Landmarks in Navigation Data Sets", Developments in Spatial Data Handling, pp. 469-480 (https://www.ikg.uni-hannover.de/fileadmin/ikg/staff/publications/Konferenzbeitraege_full_review/EliasBrenner_sdh2004.pdf) (2005).

*Primary Examiner* — Charles J Han
(74) *Attorney, Agent, or Firm* — Finnegan, Henderson, Farabow, Garrett & Dunner LLP

(57) ABSTRACT

The present disclosure provides systems and methods for identifying socially relevant landmarks that can facilitate wayfinding providing a landmark based route map that is easy to read and is dynamically updated by known and new landmarks based on their social relevance. GPS (Global Positioning System) locations help in identifying active zones and social media data associated with users in the zone help to identify candidate landmarks in the active zone that may be registered as new landmarks. Weights may be assigned to the landmarks based on periodicity and temporal factors to make the landmarks socially relevant and hence effective in wayfinding.

11 Claims, 10 Drawing Sheets

(51) Int. Cl.
*G01C 21/34* (2006.01)
*G06Q 50/00* (2012.01)

(52) U.S. Cl.
CPC ..... *G01C 21/3644* (2013.01); *G01C 21/3679* (2013.01); *G01C 21/3682* (2013.01); *G01S 19/45* (2013.01); *G06Q 50/01* (2013.01)

(58) Field of Classification Search
CPC .. G06F 17/3087; G06F 21/6227; G06F 3/013; G06F 3/017; G06F 3/04815; G06F 3/04847; G06K 9/00791; G06K 9/00805; G06K 9/00288; G06K 9/00577; G06K 9/00718; G06K 9/00771; G06K 9/228; G06K 9/4604; G06K 9/4647; G06K 9/4652; G06K 9/4671; G06K 9/6253; H04W 4/028; H04W 4/029; H04W 4/003; H04W 4/02; H04W 4/021; H04W 4/023; H04W 4/046; H04W 4/14; H04W 4/50; H04W 4/60; H04W 64/00; H04W 88/02; H04L 29/00; H04L 41/0893; H04L 51/26; H04L 67/125; H04L 67/18; H04L 67/22; H04L 67/24; H04L 67/306; H04L 67/34
See application file for complete search history.

(56) References Cited

U.S. PATENT DOCUMENTS

| | | |
|---|---|---|
| 2009/0143984 A1 | 6/2009 | Baudisch et al. |
| 2013/0041916 A1 | 2/2013 | Biesecker et al. |
| 2016/0131493 A1* | 5/2016 | Bostick .............. G01C 21/3476 701/537 |

* cited by examiner

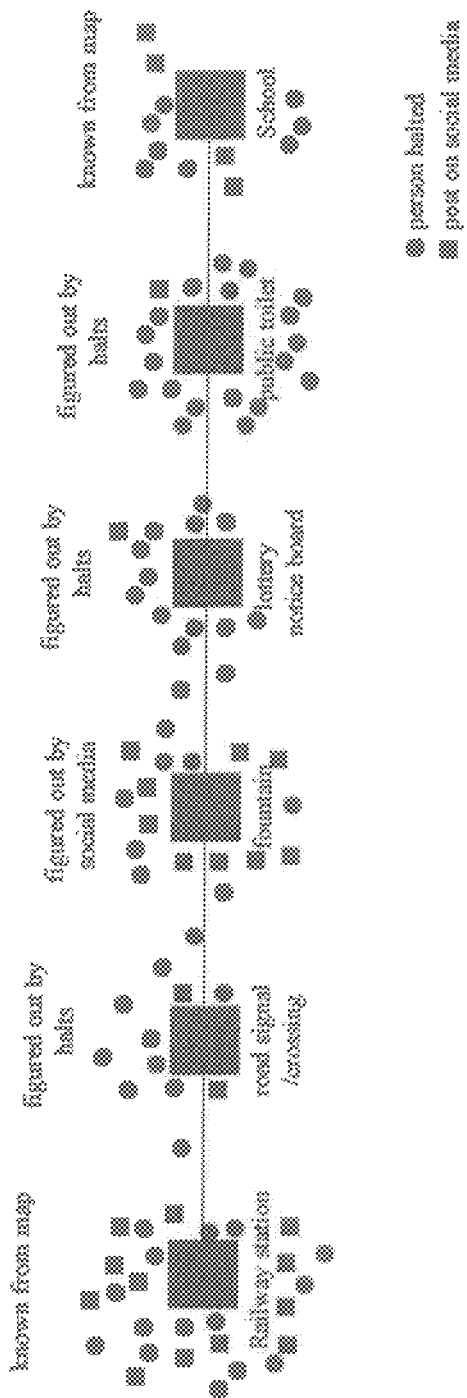

SYSTEMS AND METHODS FOR IDENTIFYING SOCIALLY RELEVANT LANDMARKS

PRIORITY CLAIM

This U.S. patent application claims priority under 35 U.S.C. § 119 to: Indian Application No. 201621016625 filed on May 12, 2016. The entire contents of the aforementioned application are incorporated herein by reference.

TECHNICAL FIELD

The embodiments herein generally relate to wayfinding systems, particularly landmark based wayfinding systems that take into account dynamic/temporal aspects associated with a location.

BACKGROUND

Prior art landmark based navigation systems are generally cartographic and terrain based, and based on visual/physicality of the landmark. Again these landmarks are static and are representative of available long standing landmark databases, hence may not be up-to-date or necessarily socially relevant. As against navigation, wayfinding is a complex problem with several dimensions to be considered that are not just terrain and visual based, but also based on human interactions and temporal aspects. Humans play an important part in associating landmarks to places—people give meaning to places. For instance, people relate to a particular location as "Jagtap Dairy" in Pune city, although no such dairy exists there currently (but did exist historically). Again a particular location in Thane city is recognized as "Castle Mill" but there is no such mill existing today. Yet these are popular places and used as landmarks. They may visually not qualify as landmarks, but any person in the locality may use such references as landmarks to guide people by virtue of them being popular and hence serving as landmarks. Hence people are an important aspect to wayfinding, w.r.t. landmarks. This aspect of people/humans informing and influencing wayfinding is generally missing in general cartographic, Global Positioning System (GPS) and navigation systems found in prior art. Additionally, a socio-technical approach to wayfinding also allows the benefit of dynamic/temporal aspects of places to be considered.

SUMMARY

Embodiments of the present disclosure present technological improvements as solutions to one or more of the above-mentioned technical problems recognized by the inventors in conventional systems.

The present disclosure provides systems and methods that enable wayfinding in a simple and user-friendly manner. In an aspect, there is provided a method comprising deriving a graph from a markup language structure of a map service for a zone under consideration, the graph comprising locations and paths therebetween; imploding the graph to obtain a landmark graph of known landmarks in the zone; identifying new landmarks based on at least one of Global Positioning System (GPS) locations and social media data associated with users in the zone; and dynamically updating the known landmarks and the new landmarks in the landmark graph based on social relevance.

In another aspect, there is provided a system comprising: one or more data storage devices operatively coupled to the one or more processors and configured to store instructions configured for execution by the one or more processors to: derive a graph from a markup language structure of a map service for a zone under consideration, the graph comprising locations and paths therebetween; implode the graph to obtain a landmark graph of known landmarks in the zone: Identify new landmarks based on at least one of GPS locations and social media data associated with users in the zone; and dynamically update the known landmarks and the new landmarks in the landmark graph based on social relevance.

In yet another aspect, there is provided a computer program product comprising a non-transitory computer readable medium having a computer readable program embodied therein, wherein the computer readable program, when executed on a computing device, causes the computing device to: derive a graph from a markup language structure of a map service for a zone under consideration, the graph comprising locations and paths therebetween; implode the graph to obtain a landmark graph of known landmarks in the zone; identify new landmarks based on at least one of GPS (Global Positioning System) locations and social media data associated with users in the zone; and dynamically update the known landmarks and the new landmarks in the landmark graph based on social relevance.

In an embodiment of the present disclosure, the method of the present disclosure further comprises: generating heat maps based on the GPS locations to identify active zones in the zones under consideration, the GPS locations relating to user behavior in the zones under consideration; analyzing the social media data to identify candidate landmarks in the active zones: and registering the candidate landmarks as new landmarks.

In an embodiment of the present disclosure, registering the candidate landmarks is preceded by validating the candidate landmarks by one or more of crowdsourcing, comparing with known maps and surveys.

In an embodiment of the present disclosure, analyzing the social media data comprises using one or more of Natural Language Processing (NLP) and term frequency-inverse document frequency (tf-idf) techniques.

In an embodiment of the present disclosure, the methods described herein above may further comprise assigning one or more of global weight, relative weight and temporal weight to the known landmarks and the new landmarks based on the active state of the zones and the analyses of the social media data for attributing social relevance to the known landmarks and the new landmarks.

In an embodiment of the present disclosure, the methods described herein above may further comprise generating at least one landmark based route map based on the known landmarks and the new landmarks for a user defined route request between a source and a destination in the zone by: identifying primary landmarks on the landmark based route map considering the global weights associated with the known landmarks and the new landmarks; filtering the primary landmarks depending on relevance of the primary landmarks based on the time of the user defined route request and the temporal weights associated thereof; and selectively appending the primary landmarks retained after the filtering with one or more of the known landmarks and the new landmarks by considering the number of primary landmarks retained after the filtering and distances therebetween along the landmark based route map based on the temporal weights associated thereof.

In an embodiment of the present disclosure, the methods described herein above may further comprise one or more of: generating the landmark based route map by considering the relative weights associated with the primary landmarks along the landmark based route map; appending one or more of the known landmarks and the new landmarks at decision points along the landmark based route map; appending one or more of the known landmarks and the new landmarks at periodic distances; and performing one of appending or eliminating one or more of the known landmarks and the new landmarks based on a user defined request for quantum of detail in the landmark based route map.

In an embodiment of the present disclosure, the methods described herein above may further comprise one or more of: a degree of ease in reaching the destination; time taken to reach the destination based on the landmark based route map; and the landmark based route map based degree of details received from the user.

In an embodiment of the present disclosure, the methods described herein above may further comprise: assigning one or more of the global weight, the relative weight and the temporal weight to the user identified landmarks; and identifying the one or more user defined landmarks as known landmarks for the landmark based route map from the source to the destination based on the one or more of the assigned global weight, the relative weight and the temporal weight.

In an embodiment of the present disclosure, identifying primary landmarks on the landmark based route map comprises one or more of: identifying candidate landmarks by one or more of crowdsourcing, comparing with known maps and surveys and assigning one or more of the global weight, the relative weight and the temporal weight thereof; and presenting virtual landmarks through augmented reality to the user as a guide along the user defined route request, when there are no known landmarks and new landmarks in the user defined route request between a source and a destination in a zone or the user is lost.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which:

FIG. 7B through FIG. 7D illustrate representative stages in accordance with an embodiment of the method of the present disclosure for generating a landmark based route map.

Figure 1:
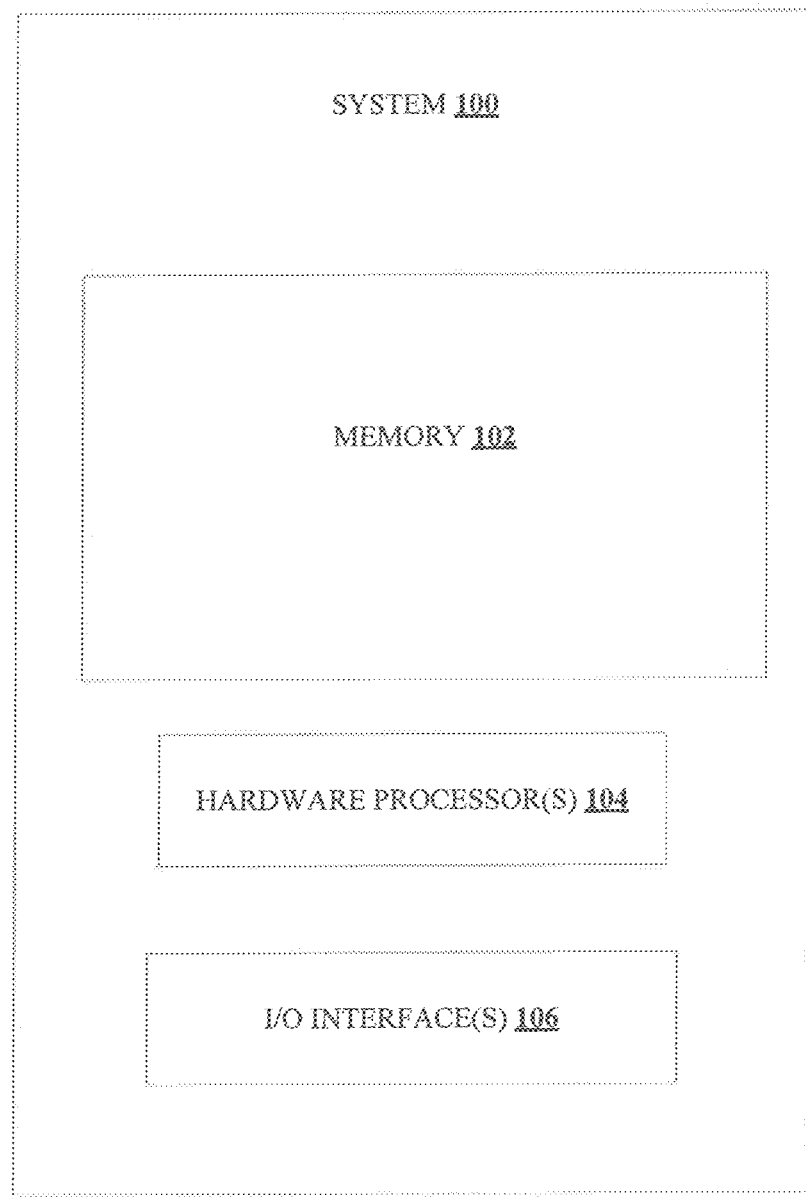
FIG. 1 illustrates an exemplary block diagram of a system for identifying socially relevant landmarks in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments, it is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

Referring now to the drawings, and more particularly to FIGS. 1 through 7, where similar reference characters denote corresponding features consistently throughout the figures, there are shown preferred embodiments and these embodiments are described in the context of the following exemplary system and method.

FIG. 1 illustrates an exemplary block diagram of a system 100 for identifying socially relevant landmarks in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of portable computing systems, such as laptop computers, notebooks, handheld devices including cell phones, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
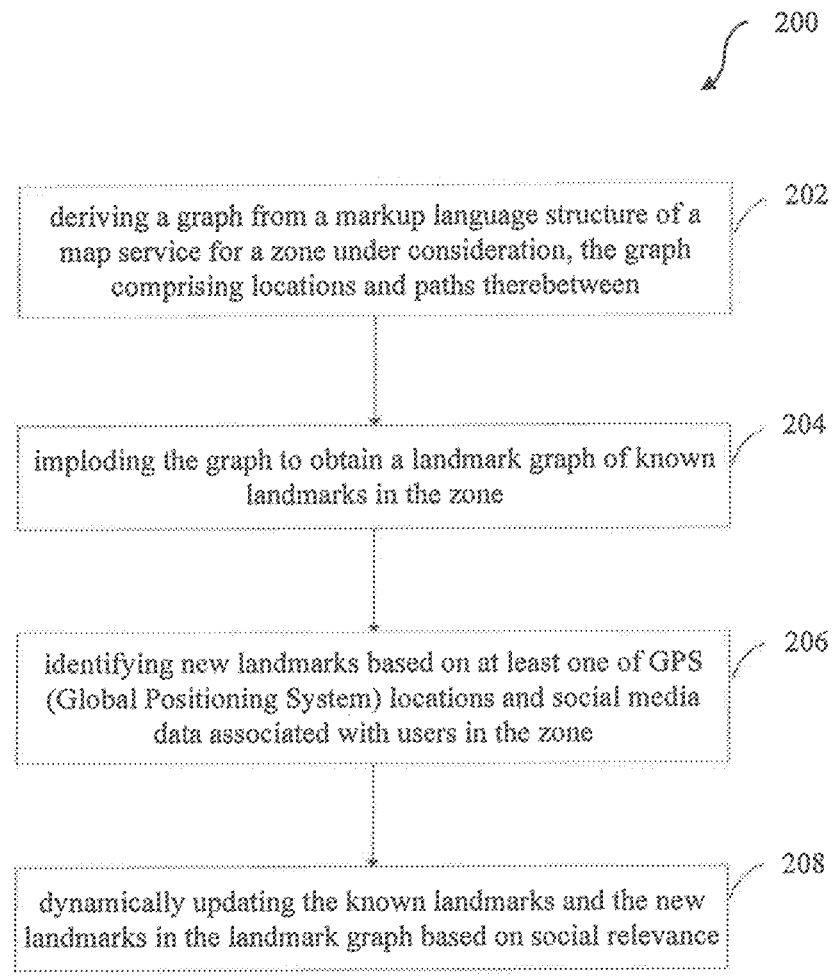
FIG. 2 illustrates an exemplary flow diagram of a method for identifying socially relevant landmarks in accordance with an embodiment of the present disclosure.
Figure 3:
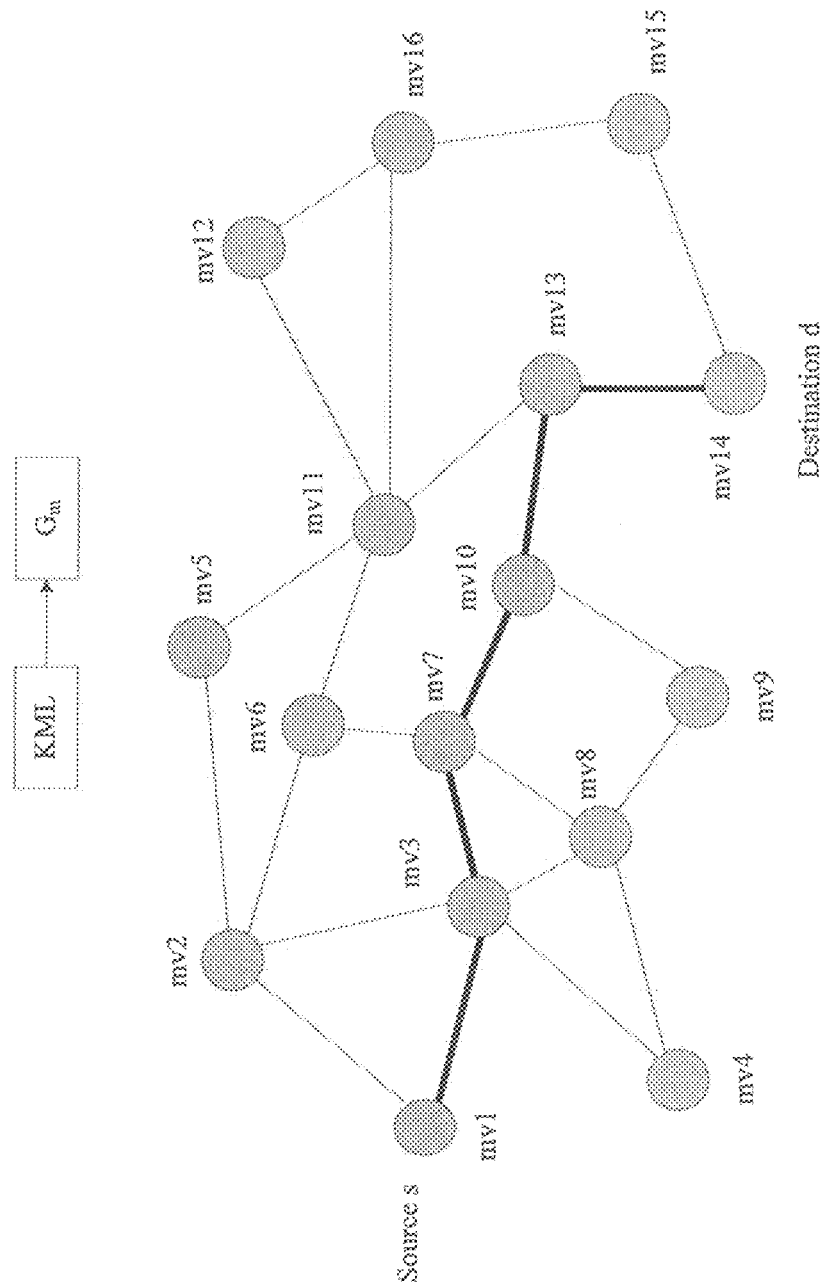
FIG. 3 illustrates an exemplary representation of deriving a graph from a Keyhole Markup Language (KML) structure of a map service for a zone under consideration in accordance with an embodiment of the method of the present disclosure.
Figure 4:
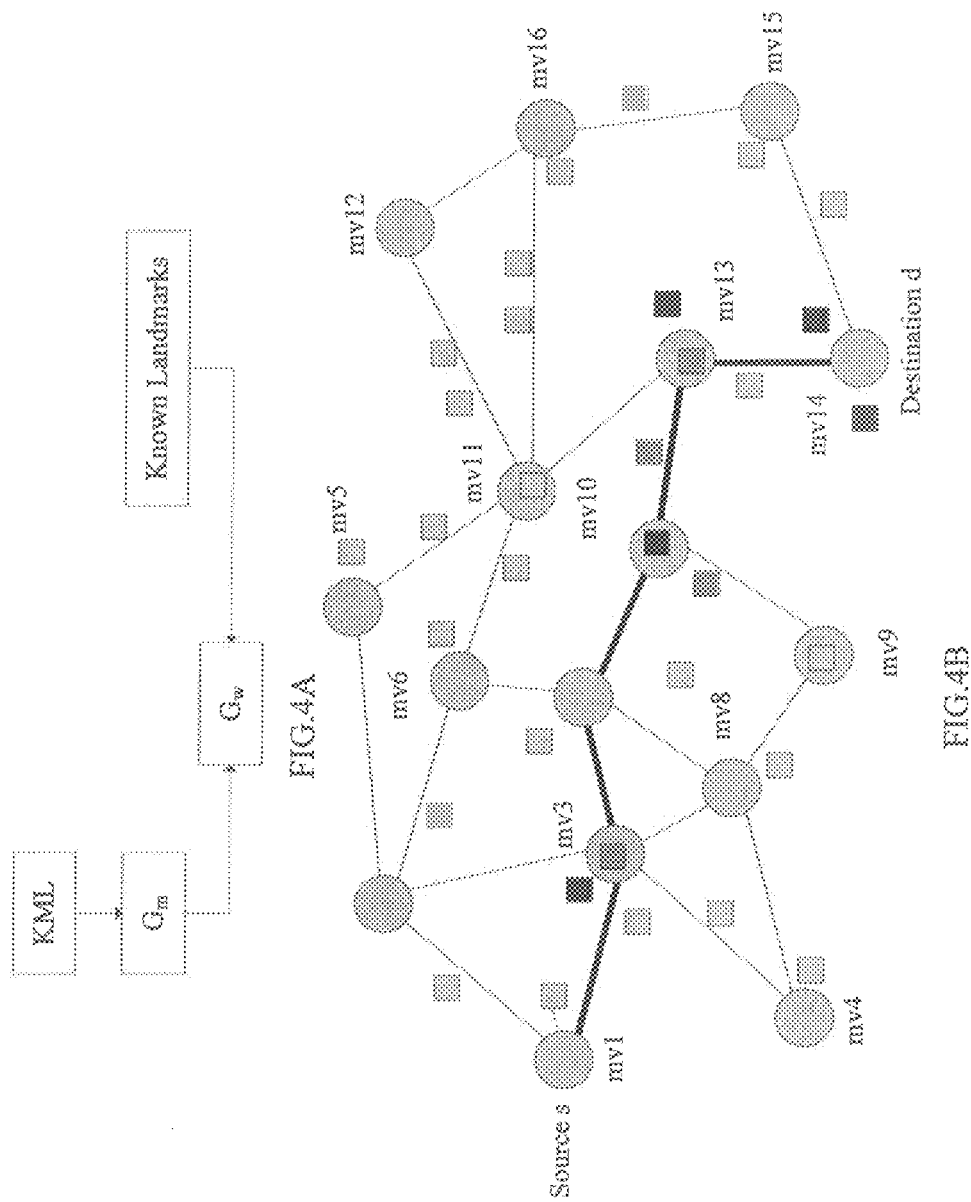
FIG. 4A illustrates an exemplary block diagram representing imploding the graph to obtain a landmark graph of known landmarks in a zone in accordance with an embodiment of the method of the present disclosure.
FIG. 4B illustrates an exemplary representation of an imploded graph comprising known landmarks in a zone in accordance with an embodiment of the present disclosure.
Figure 5:
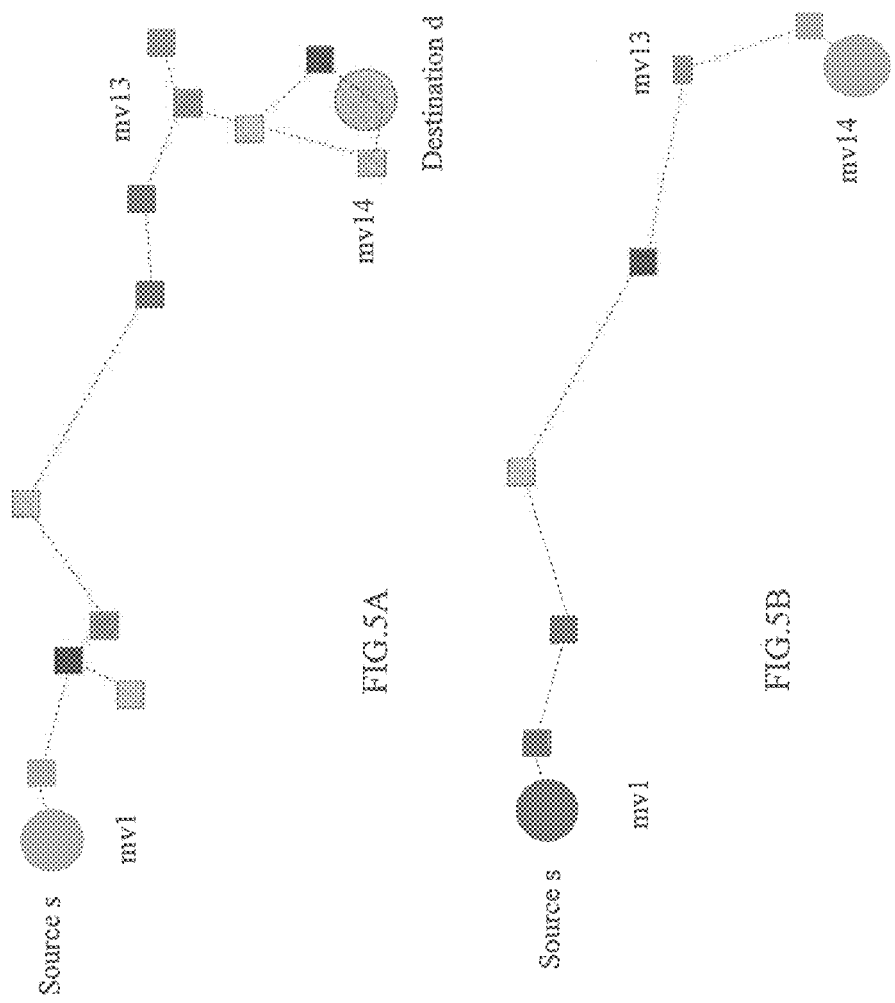
FIG. 5A and FIG. 5B illustrate exemplary representations of zoomed in and a zoomed out imploded graphs respectively in accordance with an embodiment of the present disclosure.

FIG. 2 illustrates an exemplary flow diagram of a method 200 for identifying socially relevant landmarks in accordance with an embodiment of the present disclosure. In an embodiment, the system 100 comprises one or more data storage devices or memory 102 operatively coupled to the one or more processors 104 and is configured to store instructions configured for execution of steps of the method 200 by the one or more processors 104. Map services generally provide graphs of geographical zones, referred hereinafter as zones in markup language structure. At step 202, the system 100 derives a graph $G_m$ from the markup language structure, such as Keyhole Markup Language (KML), for a zone under consideration as illustrated in FIG. 3. FIG. 3 represents the derived graph $G_m$ with mv1 through mv16 representing available standard locations en route source s to destination d. At step 204, the graph $G_m$ of FIG. 3 is imploded by bootstrapping known landmarks in the zone and generating a landmark graph $G_w$ as illustrated in FIG. 4A by an exemplary block diagram.

At step 206, new landmarks are identified based on either GPS (Global Positioning System) Global Positioning System (GPS) locations or social media data associated with users in the zone or a combination thereof. For instance, if the system 100 is implemented in a cell phone, a user can be tracked via GPS and user behavior such as halts made by the user along with the duration of halts may be captured. Alternatively, locations or places may be tracked by capturing user behavior that may be matched to pre-defined rules. For instance, users clicking pictures or selfies, hovering around a place or location, frequent pauses/halts at a location or place, and the like may be captured. In an embodiment, heat maps may be generated based on this tracking to identify active zones or zones where many users seem to halt or pause such as tourist spots, crossings, cafes, and the like. Again, social media data associated with these active zones may be analyzed to identify candidate landmarks using one or more of Natural Language Processing (NLP) and term frequency-inverse document frequency (tf-idf) techniques. For instance, NLP may be performed on text like "watch for location/landmark specific sentences like 'I am at _____, meet me at _____, I see a _____', and the like" (geo-tagged). In an embodiment, platforms such as Facebook™, Twitter™, Instagram™, Flickr™, and the like may be crawled to identify relevant social media data. Through such techniques and analysis, potential names of candidate landmarks and their qualitative characteristics may be captured such as "big white building", "Peepal tree", "smelly garbage bin", "yellow billboard", "broken phone Booth", and the like. The system 100 may analyze texts, pictures and posts from social media may be analyzed. Every relevant text, picture or post identified after NLP is treated as a document and tf-idf may be done on the corpus of the documents. Geo-tagging facilitates clustering of the posts/texts/pictures to filter them based on zones that they are associated with. Candidate landmarks may be identified by comparing with existing or known maps or by surveying or capturing inputs on the candidate landmarks via say gamification techniques through crowdsourcing to validate them before they are registered as new landmarks in the system 100. An exemplary game may involve displaying a map of a zone to users along with candidate landmark names and get people to identify the candidate landmarks on the displayed map. Surveys can include formal surveys or recorded sound clips of users on a route using the system 100 to find a location, wherein the sound clips are indicative of users asking around for help in finding the route. Such sound clips, may then be analyzed for candidate landmarks through NLP, gamification techniques, and the like.

Once the new landmarks are identified, there are different types of weight assigned to the landmarks such as global weights, relative weights and temporal weights. The global weights may be representative of how popular the landmarks are. The relative weights may be representative of the relative importance of the landmarks along a given route, especially if they have similar global weights or if there are many landmarks in the vicinity. The temporal weights capture relevance of the landmarks based on periodicity such as specific days, weeks or months, time of the day such as day time, early morning, and the like. In an embodiment, the temporal weight≥the relative weight≥the global weight. In an embodiment, the system 100 assigns one or more of global weight, relative weight and temporal weight to the known landmarks and the new landmarks based on the active slate of the zones and the analyses of the social media data for attributing social relevance to the known landmarks and the new landmarks.

In an embodiment one or more landmark based route map based on the known landmarks and the new landmarks for a user defined route request between a source and a destination in the zone can be populated. At step 208, the known landmarks and the new landmarks in the landmark graph are dynamically updated based on their social relevance. At a first level, the landmarks are assigned global weights based on their popularity and accordingly primary landmarks on the user defined route are identified. Analyses of the social media data then attributes social relevance to the landmarks that enables them to be ranked and weighted on a pre-defined scale. Depending on the route and progress of time, the social relevance associated with the landmarks may vary and thus the primary landmarks are filtered. Again, many landmarks may have the same global weight or there may be too many landmarks in a particular route. The global weights are assessed further and provided relative weights and temporal weights. Accordingly, although at a global level, a landmark may have a certain weight (high or low), when the landmark is considered on a particular route, the relative and temporal weights may be dynamically computed based on the route or presence of other landmarks en route or periodicity. The system 100 may compare the associated social media data and heat maps generated at a local level leading to better granularity or local maxima.

Let $n_t$ be the number of people halting for at least a duration d seconds at a location point $p_t$ (GPS location) clustered within a radius r at a given time duration t which represents an hour of the day (t ranges from t=1 to t=24, for each hour of the day).

Let $c_1$ be a threshold for the number of people clustered/halted around $p_t$ in the time duration t.

If $n_t > c_t$, then $p_t$ is a potential landmark.

Similarly, let $s_{nt}$ be the number of posts made at the location point $p_t$ within the radius r.

Let $s_{ct}$ be a threshold for the number of posts around the location point $p_t$ in the time duration t.

If $s_{nt} > s_{ct}$, there is a high number of posts which matches with the number of people halting.

The posts are analyzed by, say, NLP to identify the name or purpose of the location point $p_t$. If after analysis it appears that the place is a potential landmark, then it is identified as a candidate landmark. In another embodiment, users may be prompted to provide information about the location point $p_t$, if the location point $p_t$ is not identified as socially relevant, it may be discarded or ignored as an anomaly.

A weight w is assigned to the location point $p_t$ relative to other landmarks in the vicinity (number of people halting, and number of posts). Since the social data and user locations are captured at different time durations, the landmark's social relevance is dynamic by nature depending on day of week, time of day, social factors, season, and the like. This means landmarks may also be removed from the system 100. Hence the date/time is captured each time information is captured, and is accordingly analyzed. Hence, for a user defined route request, depending on the day/time/season, the resulting landmark based route map may vary. Also, since the landmarks are dynamically identified based on social parameters, they are real time relevant and more likely to be relevant.

FIG. 4B illustrates an exemplary representation of an imploded graph comprising known landmarks in a zone, in accordance with an embodiment of the present disclosure, generated when the system 100 receives user inputs pertaining to user defined route request between a source and a destination. The circular nodes represent standard locations and the square shapes represent known landmarks associated with weights based on their social relevance (as described herein above). Known landmarks with higher social relevance are represented in FIG. 4B with a darker shade as compared to known landmarks with lower social relevance. As described herein above, the imploded graph is based on a graph from a KML structure of map services such as Google™ or Yahoo™ that is bootstrapped with known landmarks. A user defined route is a walk through the imploded graph that facilitates wayfinding. The system 100 enables generating a landmark based route map by converting a portion of the imploded graph to a landmark graph based on the user defined route Request; the landmark based route map being a simplified graph comprising only socially relevant landmarks instead of the standard locations in a map that aid cartographic navigation but are not effective in wayfinding.

Let $G_m (v_m, e_m)$ represent a graph obtained from the KML structure of maps like Google™ maps or Yahoo™ maps, wherein $v_m$ represents vertices indicating of landmarks and $e_m$ represents edges connecting the vertices $v_m$.

Let $G (v, e)$ represent a graph obtained after including vertices $v_t$, and edges $e_1$ and $e_{im}$, wherein $v_1$ represent landmarks, each $v_1$ being associated with at least one proximate landmark $v_m$ belonging to the graph $G_m$ based on its distance from $v_m$.

$e_{im}$ represents edges between the vertices $v_1$ and existing map vertices $v_m$.

$e_1$ represent edges between the vertices $v_1$.

v refers to vertices including $v_1$ and $v_m$.

e refers to edges including $e_m$, $e_{im}$ and $e_1$.

When the user defined route request between say vertex A representing the source and vertex B representing the destination is received, the graph G is imploded or simplified to graph G' for further processing. G' (v', e') represents a graph of all possible routes between vertex A and vertex B and requires lesser processing and memory usage since a smaller and simpler graph G' is processed.

One complete route in G' from vertex A to vertex B maybe $A \rightarrow v_1 \rightarrow v_2 \rightarrow v_3 \rightarrow v_4 \rightarrow B$.

Say the weights of exemplary vertices along the user defined route are $v_1$ (w=5), $v_2$ (w=1), $v_3$ (w=3), $v_4$ (w=2), $v_5$ (w=4), $v_6$ (w=2), $v_7$ (w=1).

If the user decides to choose only major landmarks (say weight 3 and above), then the route generated for the user may be $A \rightarrow v_1 \rightarrow v_3 \rightarrow v_5 \rightarrow B$ and the route may comprise new edges between vertices ($v_1$ to $v_3$, $v_3$ to $v_5$).

In an embodiment, the user may receive textual instructions or voice based instructions as a guide to follow a route and is not required to have an understanding of directional concepts like north, south, east and west. User friendly directions using simple expressions such as straight, left, right, distance, time, etc. may be provided. The system 100 may not give the entire 2D overview of the zone that may confuse the user. Instead, the system 100 facilitates wayfinding by emulating a pedestrian's experience when he/she checks with passersby for directions.

In an embodiment, the system 100 may receive one or more user identified landmarks from the user in the route and append the landmark based route with the one or more user identified landmarks and regenerate the landmark based route map from the user defined landmark to the desired destination. The user defined landmarks may be assigned weights and included in the system 100 as known landmarks thereby making the system real time and up-to-date at any given time.

Figure 6:
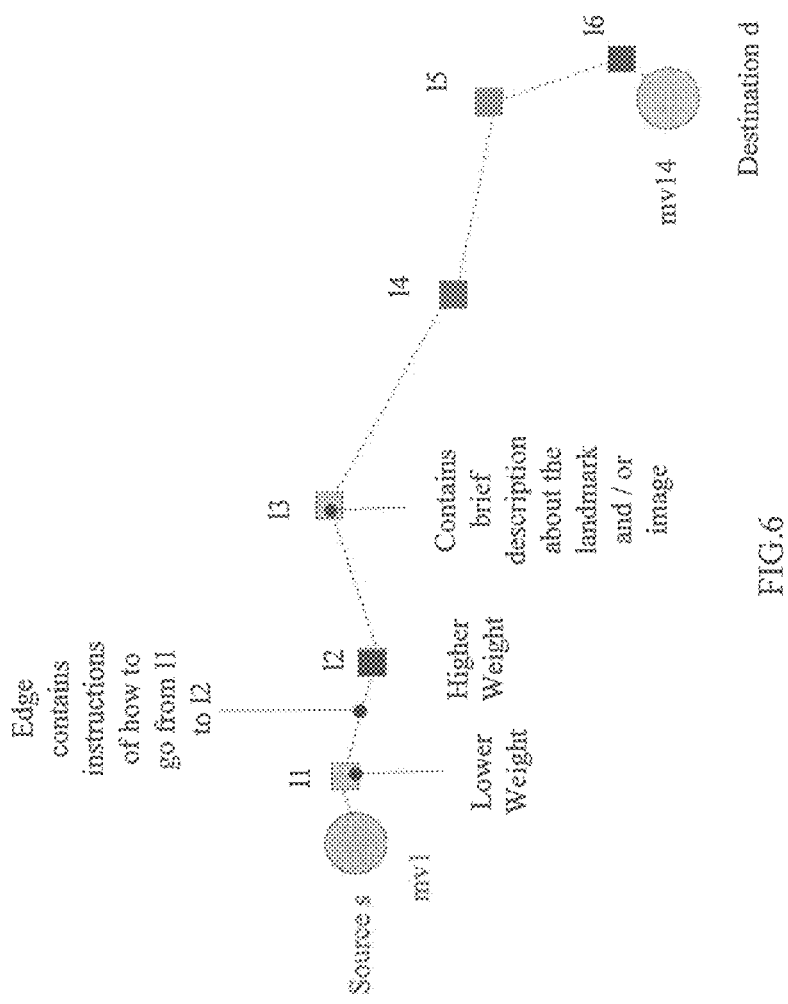
FIG. 6 illustrates an exemplary representation of a landmark graph with instructions and weights in accordance with an embodiment of the present disclosure.

In an embodiment, the system 100 may further compute a degree of ease in reaching the desired destination and the time taken for each route generated thus enabling the user to decide the route of his choice. Again the user may decide the degree of details needed in the route. FIG. 5A and FIG. 5B illustrate exemplary representations of zoomed in and a zoomed out imploded graphs respectively, in accordance with an embodiment of the present disclosure, wherein FIG. 5A includes a detailed view with relatively more number of landmarks (referenced as mv1, mv13, and mv14) identified between the source s and the destination d as compared to FIG. 5B. FIG. 6 illustrates an exemplary representation of a landmark graph with instructions and weights (shaded square shaped landmarks referenced as 11, 12, . . . 16) in accordance with an embodiment of the present disclosure. As the user is guided along the route, the system 100 directs the user to a nearest landmark by guiding the user along an edge connecting the nearest landmark to a subsequent landmark (11 to 12). In accordance with the present disclosure, the instructions maybe textual or in audio format. The user can zoom in or zoom out for more/less details. Each landmark has a social weightage as described herein above. If the user is partly familiar with the zone, he may not need a very detailed route. A few key landmarks may be sufficient. Based on the social weightage, the system 100 computes the key landmarks and permits the user to tune how much details he needs—ranging from the most possible landmarks, to only few key landmarks.

Figure 7A:
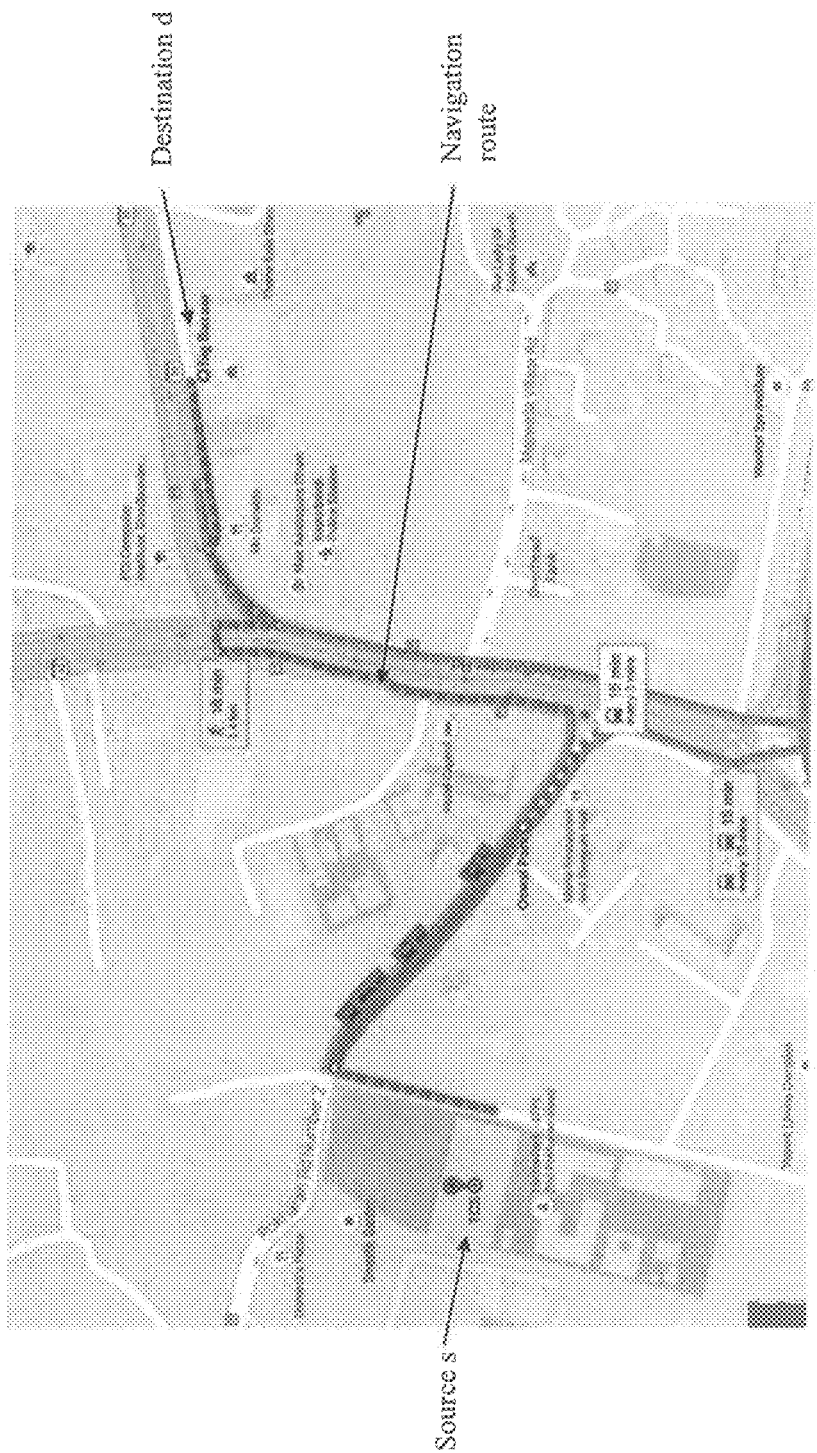
FIG. 7A illustrates a map of an exemplary route as known in the art.
Figure 7B:
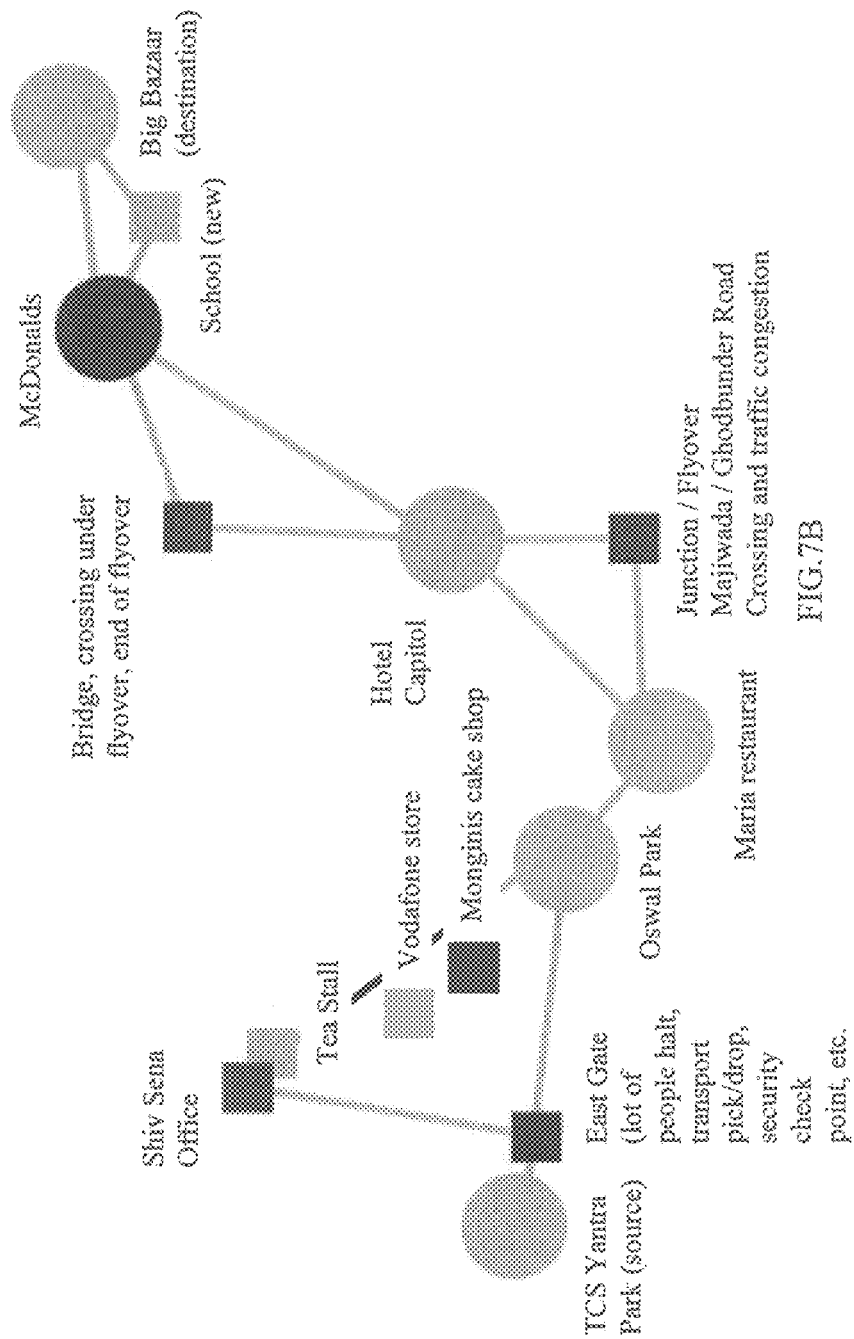
Figure 7D:
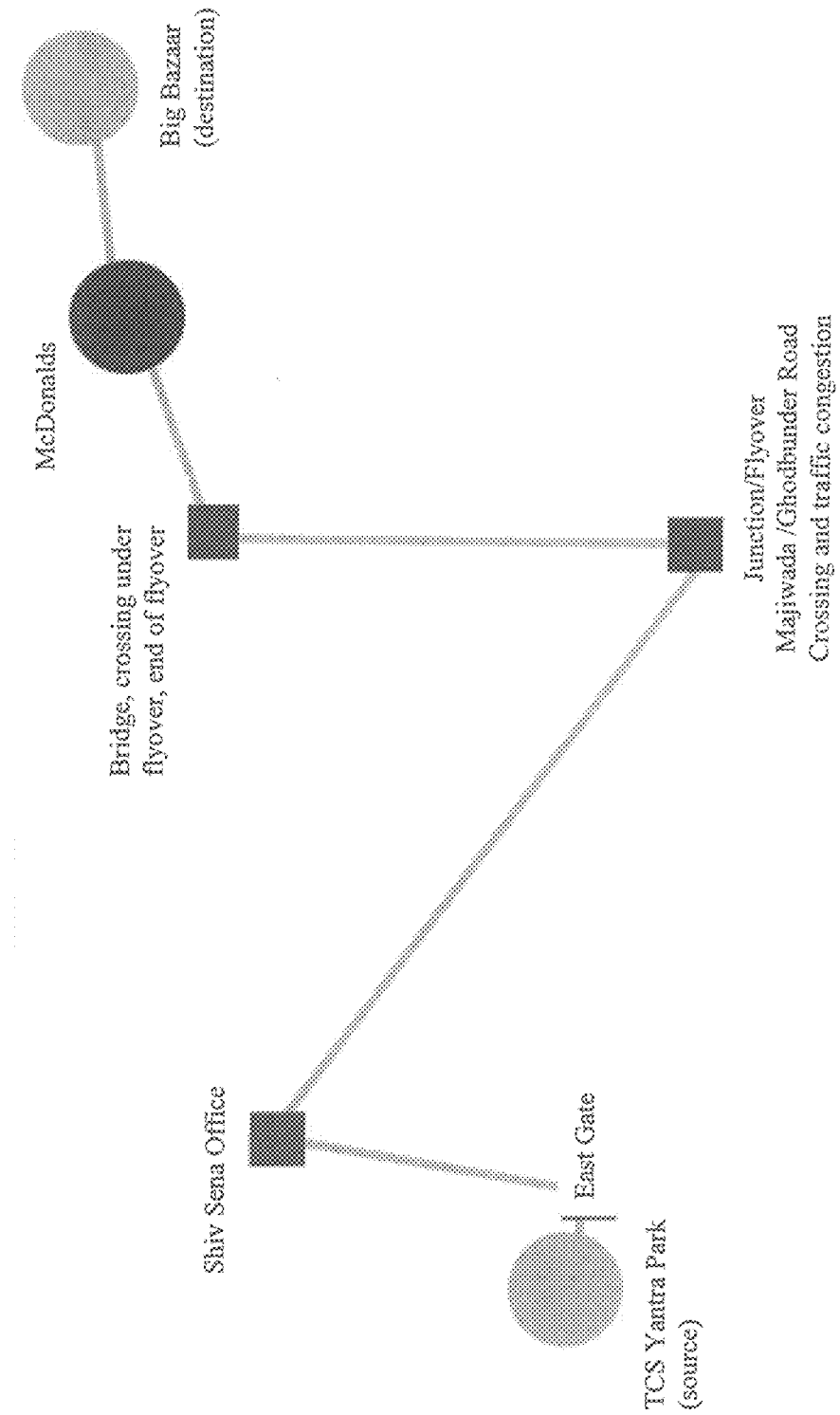

FIG. 7A illustrates a map of an exemplary route as known in the art. The exemplary route depicted is a route between a source location Yantra Park, a TCS™ facility in Thane to a destination location Big Bazaar, a supermarket in the vicinity, as obtained from Google™ map service. FIG. 7B through FIG. 7D illustrate representative stages in accordance with an embodiment of the method of the present disclosure for generating a landmark based route map. In FIG. 7B. The standard locations/landmarks obtained from the KML structure is represented by circles such as Oswal park, Maria restaurant, Hotel Capitol and McDonalds, whereas squares represent landmarks that emerge from user behavior (user halting at a location) and validating such locations by comparing with social media posts, users, etc. New landmarks in the illustration include East gate, Junction Flyover, Monginis™ cake shop, and the like. FIG. 7C illustrates a representation of landmarks emerging dynamically from user behavior in accordance with the present disclosure. For instance, when many users walk along a route, railway stations, road signals, fountains, lottery notice boards, public toilets, schools, and the like are candidate landmarks. An analysis of halts, social media posts and the like enable the system of the present disclosure to identify new landmarks as depicted. FIG. 7D further illustrates a landmark graph comprising known landmarks (circles) and new landmarks (squares) based on social relevance and a landmark based route map from the source location Yantra Park to the destination location Big Bazaar. The exemplary route map provides relatively lesser details for a user who is familiar with the locality. The route map may append one or more known or new landmarks at periodic distance (for instance at every 'x' distance) or depending on a user defined request for quantum of detail required by the user. Unlike cartographic navigation where the user is required to have a fair sense of direction (north/south/east/west) and the ability to read maps, the landmark based route map of the present disclosure provides simple wayfinding guide with an exemplary script as given below—

User enters Big Bazaar as destination on his phone.

A user hand held device such as a phone defects the user's location as TCS™ Yantra park, finds the route, and then calculates sufficiently zoomed out set of landmarks as illustrated in FIG. 7D.

The User receives instructions from the system of the present disclosure on the phone: "Find the East gate of TCS office." In an embodiment, the phone may provide an image/media sample to help identify the location.

When the user reaches the East gate, the phone detects that the user is at the suggested location and prompts the user that he has reached there: "If you are facing the gate from outside, then walk 100 meters to the right, and you will find a Shiv Sena office at the end of the road". The phone may display a picture of the Shiv Sena office.

When the user reaches the Shiv Sena office, the system of the present disclosure prompts: "Walk 200 meters to the right and you will come to a junction and flyover", with a picture.

When the user reaches the junction, the phone prompts: "Walk 100 meters to the right till you reach a crossing under the flyover and a small bridge", with a picture.

When the user reaches there, the phone points out McDonalds, with a picture, and directs to walk straight on till the user reaches the desired destination.

The system of the present disclosure thus provides an informal, simple and user friendly method for wayfinding that emulates a user's experience if he/she were to ask around for guidance.

In an embodiment, when there are no identifiable landmarks, the system of the present disclosure can provide virtual landmarks through augmented reality in zones where physical landmarks are not available. The users may use camera or such visual aids available in phones or other hand held devices to view and see virtual landmarks which can guide them for wayfinding.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders, in other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method comprising:
    deriving a graph from a markup language structure of a map service for a zone under consideration, the graph comprising locations and paths therebetween;
    identifying new landmarks based on at least one of GPS (Global Positioning System) locations obtained from a GPS receiver and social media data associated with users in the zone;
    assigning one or more of the global weights, relative weight and the temporal weights to known landmarks and the new landmarks based on the active state of the zones and the analyses of the social media data for attributing social relevance to the known landmarks and the new landmarks;
    generating at least one landmark based route map based on the known landmarks and the new landmarks for a user defined route request between a source and a destination in the zone by:
        identifying primary landmarks on the landmark based route map considering the global weights associated with the known landmarks and the new landmarks;
        filtering the primary landmarks depending on relevance of the primary landmarks based on the time of the user defined route request and temporal weights associated thereof;
        selectively appending the primary landmarks retained after the filtering with one or more of the known landmarks and the new landmarks by considering the number of primary landmarks retained after the filtering and distances therebetween along the landmark based route map based on the temporal weights associated thereof;
        simplifying the graph from the markup language structure to obtain the landmark based route graph based on the user defined route request, wherein the simplified graph comprises only landmarks of at least a minimum weight requested by the user; and
    dynamically updating the known landmarks and the new landmarks in the landmark graph based on social relevance.

2. The processor implemented method of claim 1 further comprising:
    generating heat maps based on the GPS locations to identify active zones in the zones under consideration, the GPS locations relating to user behavior in the zones under consideration;
    analyzing the social media data to identify candidate landmarks in the active zones; and registering the candidate landmarks as new landmarks.

3. The processor implemented method of claim 2, wherein registering the candidate landmarks is preceded by validating the candidate landmarks by one or more of crowdsourcing, comparing with known maps and surveys.

4. The processor implemented method of claim 2, wherein analyzing the social media data comprises using one or more of Natural Language Processing (NLP) and term frequency-inverse document frequency (tf-idf) techniques.

5. The processor implemented method of claim 1 further comprising one or more of:
    generating the landmark based route map by considering the relative weights associated with the primary landmarks along the landmark based route map;
    appending one or more of the known landmarks and the new landmarks at decision points along the landmark based route map;
    appending one or more of the known landmarks and the new landmarks at periodic distances; and
    performing one of appending or eliminating one or more of the known landmarks and the new landmarks based on a user defined request for quantum of detail in the landmark based route map.

6. The processor implemented method of claim 1 further comprising computing one or more of:
    a degree of ease in reaching the destination;
    time taken to reach the destination based on the landmark based route map; and
    the landmark based route map based degree of details received from the user.

7. The processor implemented method of claim 1, wherein identifying primary landmarks further comprises:
    receiving one or more user identified landmarks from a user in the zone;
    appending the landmark based route map with the one or more user identified landmarks and regenerating the landmark based route map from the one or more user defined landmarks to the destination.

8. The processor implemented method of claim 1 further comprising;
    assigning one or more of the global weight, the relative weight and the temporal weight to the user identified landmarks; and
    identifying the one or more user defined landmarks as known landmarks for the landmark based route map from the source to the destination based on the one or more of the assigned global weight the relative weight and the temporal weight.

9. The processor implemented method of claim 1, wherein identifying primary landmarks on the landmark based route map comprises one or more of:
    identifying candidate landmarks by one or more of crowd-sourcing, comparing with known maps and surveys and assigning one or more of the global weight, the relative weight and the temporal weight thereof; and
    presenting virtual landmarks through augmented reality to the user as a guide along the user defined route request, when there are no known landmarks and new landmarks in the user defined route request between a source and a destination in a zone or the user is lost.

10. A system comprising:
    one or more data storage devices operatively coupled to the one or more processors and configured to store instructions configured for execution by the one or more processors to:

derive a graph from a markup language structure of a map service for a zone under consideration, the graph comprising locations and paths therebetween;

identify new landmarks based on at least one of GPS (Global Positioning System) locations obtained from a GPS receiver and social media data associated with users in the zone;

assign one or more of the global weights, relative weight and the temporal weights to the known landmarks and the new landmarks based on the active state of the zones and the analyses of the social media data for attributing social relevance to the known landmarks and the new landmarks;

generate at least one landmark based route map based on the known landmarks and the new landmarks for a user defined route request between a source and a destination in the zone by:

identify primary landmarks on the landmark based route map considering global weights associated with the known landmarks and the new landmarks;

filter the primary landmarks depending on relevance of the primary landmarks based on the time of the user defined route request and temporal weights associated thereof;

selectively appending the primary landmarks retained after the filtering with one or more of the known landmarks and the new landmarks by considering the number of primary landmarks retained after the filtering and distances therebetween along the landmark based route map based on the temporal weights associated thereof;

simplify the graph from the markup language structure to obtain the landmark based route graph based on the user defined route request, wherein the simplified graph comprises only landmarks of at least a minimum weight requested by the user; and dynamically update the known landmarks and the new landmarks in the landmark graph based on social relevance.

11. The system of claim 10, wherein the one or more processors are further configured to perform one or more of:

generating heat maps based on the GPS locations to identify active zones in the zones under consideration, the GPS locations relating to user behavior in the zones under consideration;

analyzing the social media data to identify candidate landmarks in the active zones;

registering the candidate landmarks as new landmarks;

generating the landmark based route map by considering the relative weights associated with the primary landmarks along the landmark based route map;

appending one or more of the known landmarks and the new landmarks at decision points along the landmark based route map;

appending one or more of the known landmarks and the new landmarks at periodic distances;

performing one of appending or eliminating one or more of the known landmarks and the new landmarks based on a user defined request for quantum of detail in the landmark based route map;

computing a degree of ease in reaching the destination;

computing time taken to reach the destination based on the landmark based route map;

computing the landmark based route map based degree of details received from the user;

receiving one or more user identified landmarks from a user in the zone;

appending the landmark based route map with the one or more user identified landmarks and regenerating the landmark based route map from the one or more user defined landmarks to the destination;

assigning one or more of the global weight the relative weight and the temporal weight to the user identified landmarks;

identifying the one or more user defined landmarks as known landmarks for the landmark based route map from the source to the destination based on the one or more of the assigned global weight, the relative weight and the temporal weight; and when there are no known landmarks and new landmarks in the user defined route request between a source and a destination in a zone or the user is lost, identifying candidate landmarks by one or more of crowd-sourcing, comparing with known maps and surveys and assigning one or more of the global weight, the relative weight and the temporal weight thereof; and presenting virtual landmarks through augmented reality to the user as a guide along the user defined route request.

* * * * *